Nov. 12, 1957     G. P. DE WESTFELT     2,813,236
CONTROL SYSTEM FOR ELECTRIC SERVOMOTORS
Filed Jan. 14, 1949     2 Sheets—Sheet 2

INVENTOR
GERARD P. DE WESTFELT
BY
his ATTORNEY.

United States Patent Office 2,813,236
Patented Nov. 12, 1957

2,813,236
CONTROL SYSTEM FOR ELECTRIC SERVOMOTORS

Gerard P. de Westfelt, New York, N. Y., assignor to Sperry Rand Corporation, a corporation of Delaware Application January 14, 1949, Serial No. 70,958

14 Claims. (Cl. 318—28)

This invention relates generally to control systems for electric servomotors and refers more particularly to controlling an electric servomotor adapted to operate a control surface of a moving craft or any other suitable load from a source of electric control signals. Such systems are generally employed in automatic steering systems for surface craft or aircraft.

A D. C. shunt motor can be controlled in several ways. Ordinarily, the energization of the field windings of the motor is varied in response to a control signal from a suitable source such as, for example, a magnetometer, a potentiometer or selsyn device operated manually by a steering wheel or automatically by the craft's compass. In the case where the energization of the fields of the motor is controlled, it is generally the practice to apply a fixed or constant energization to the armature of the motor. In most cases this sprovides a good linear control of the motor and prevents any square law effect which would otherwise occur if both the field and the armature energization were raised or lowered simultaneously in response to a control signal. In small servomotors particularly adapted for use in low power servo systems (under $\frac{1}{20}$ H. P.) where power efficiency and heat dissipation are not critical, it is usual to control the fields of the motor and allow full rated current to flow constantly and uni-directionally through the armature. The chief objection to this type of control of a D. C. shunt motor is that the mechanical torque output that the motor can deliver is limited by the armature energization, which must be maintained at a safe value to prevent overheating and subsequent burning out of the motor.

Another way of controlling a D. C. shunt motor is by controlling the energization of the armature winding by the control signal and keeping the field windings at a fixed energization value. This type of motor control however is rather impractical for electronic control of any but very small motors because of the very heavy armature currents required to produce a substantial mechanical torque output.

It has been general practice in the past to use a Ward Leonard or Amplidyne control for medium and large servomotors for driving heavy, bulky objects. These two systems are very satisfactory since peak loads, smooth control and reasonable power efficiency can be obtained. However, this type of control involves more equipment and therefore greater expense and weight.

The present invention overcomes all of the above-mentioned defects or deficiencies of previous servomotor control systems in that there is employed but a single motor having a very high torque output. Such a motor combines the above-mentioned types of control wherein the field windings and armature winding, are both conrtolled from the same conrtol signal.

Generally, the system of the present invention comprises a motor control wherein there is provided a source of control voltage which may be of any suitable type such as a magnetometer, potentiometer or selsyn device preferably adapted to produce a D. C. voltage proportional to the displacement of the craft from a predetermined desired course. This signal is then amplified in any suitable type of control amplifier. The output of the amplifier appears in two channels. One channel provides a reversible signal proportional to the magnitude and direction of the desired craft movement or displacement of the craft from a predetermined course which output is applied to the field windings of the servomotor to thereby produce rotation of the motor in one direction or the other depending upon the magnitude and direction of the control signal. At the same time, however, the other channel of the amplifier provides a unidirectional output proportional to the magnitude only of the control signal which output is applied to the armature of the motor in a lagging time relation to the field coil energization. The time relation between the field energization and the armature energization is so chosen that there will be no square law effect which would occur if both the field and armature energizations were raised simultaneously.

In the form of the invention shown in the attached drawings a particular type of amplifier is illustrated, i. e., a magnetic amplifier. This type of amplifier performs the same function as an electronic amplifier but is highly desirable because it has no tubes or moving parts to wear and be replaced, and because there is no limit to the size of the motor which it can control. However, it is to be understood that the invention is in no way limited or restricted to the type control signal amplifier used since electronic amplifiers with linear characteristics such as are obtained by the magnetic amplifiers shown could be employed without departing from the scope of the invention.

It is therefore a principal object of the present invention to control an electric servomotor by energizing both field and armature windings from the same source of control signal.

A further object of the invention resides in controlling an electric servomotor by energizing the field windings from a source of electrical control signal and also the armature winding from the same source of control signal but in a lagging time relation to the field winding energization.

A further object resides in controlling an electrical servomotor by energizing the field windings of the motor both in magnitude and direction dependent upon the magnitude and direction of control signal and controlling the armature winding of the motor in magnitude only from the same source of control signal.

A still further object of the present invention is to provide a motor control system or a control system for electric servomotors which comprises energizing both field and armature windings from the same source of control signal and damping the system with speed feedback signals from said motor.

A further object resides in the control of an electrical servomotor by the energization of both field and armature windings from the same source of control signal and controlling the signal by a displacement feedback signal from said motor.

Another object resides in providing a control system for electric servomotors wherein the control signal energizes both field and armature windings in a timed relationship, the control signal being amplified in separate channels by magnetic amplifiers.

The invention, in other of its aspects, relates to a novel steering system for ships and the like wherein a magnetic compass of the magnetometer type is employed to control the heading of the ship in accordance with the desired and selectable heading wherein the magnetometer output signal is supplied to a demodulator and amplifier, and wherein a servomotor connected to drive the rudder of the craft is controlled by the output of the amplifier, a potentiometer driven in accordance with movements of the rudder being provided for supplying an output which is fed back degeneratively with the error input of the amplifier, the system further including a speed generator driven by the servomotor for supplying a further feedback signal which is also connected in degenerative fashion to the input of the amplifier.

Accordingly a further object of the present invention is to provide an improved magnetic heading steering control system for ships and the like.

Other objects and advantages of the present invention not at this time more particularly enumerated will become apparent from the following detailed description of one embodiment of the invention shown in the attached drawings wherein.

Figure 1:
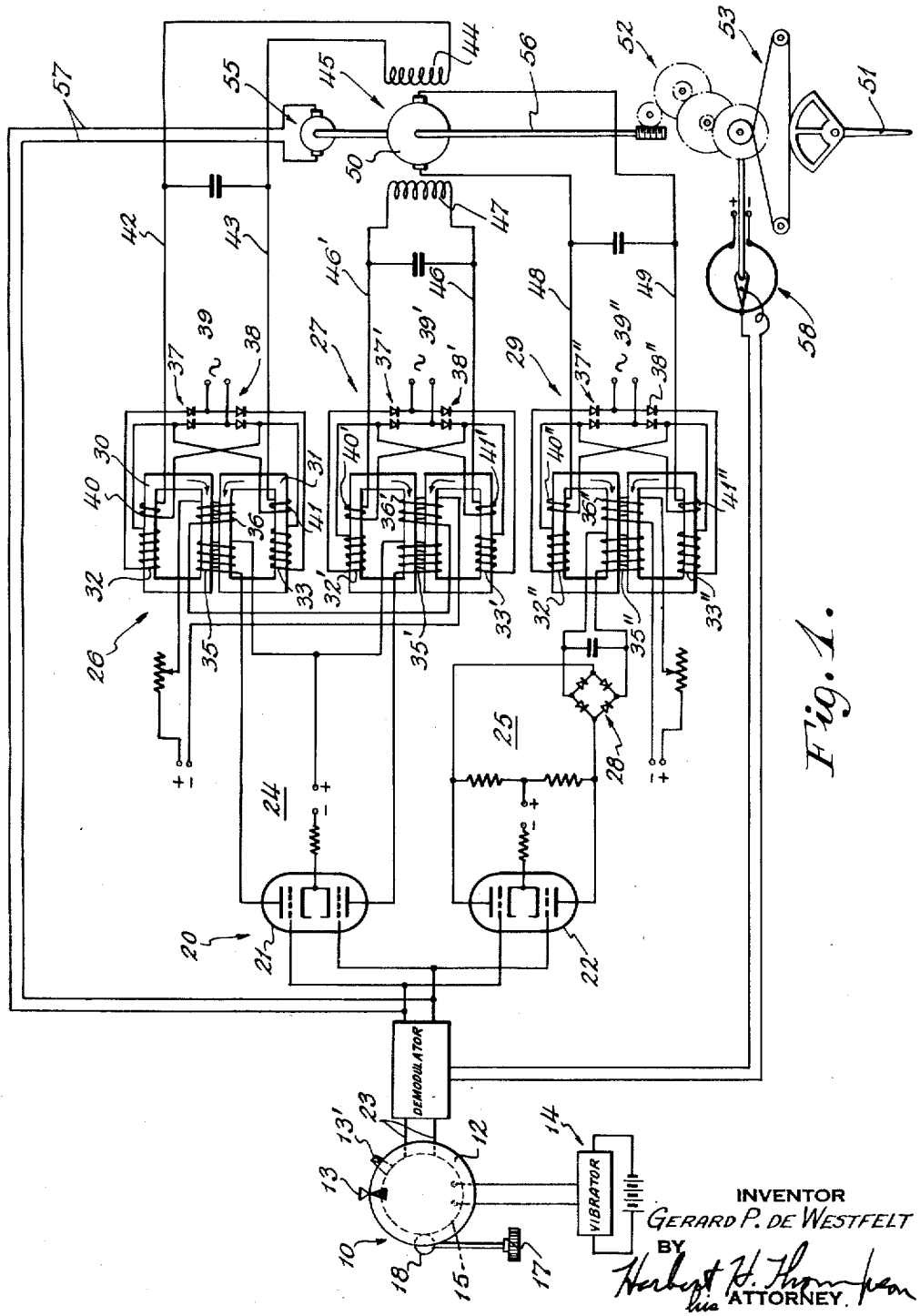
Fig. 1 is a schematic drawing of a preferred embodiment of the invention.

The servomotor control system as shown in Fig. 1 comprises a source of control signal generally indicated by reference character 10 in the form of a magnetic compass wherein a compass needle is positioned by the magnetic field of the earth. The direction of travel of the vessel upon which the compass is mounted is indicated by compass card 12 and lubber line or index 13. A source of periodically varying electrical energy necessary to the operation of a magnetometer device 15 is shown in the present case as a battery and vibrator 14. Magnetometer 15 is provided for producing a pulsating D. C. control signal proportional to the displacement between the magnetometer core and the compass needle. A control handle 17 is provided for rotating the core of magnetometer 15 in accordance with desired change of heading of the craft, this rotation being provided by gear 18. Therefore, if it is desired to change the course of the craft, the pilot rotates knob 17 in the proper direction to the desired new course as indicated by index 13. This rotation produces a rotation of the core of the magnetometer 15 with respect to the compass needle to thereby produce a pulsating D. C. control signal proportional to the difference between the present course and the desired new course setting. It will be understood that any type of device which will produce a D. C. control signal proportional to the difference between the actual heading of the craft and the desired heading of the craft may be employed and that this control signal producing means may be a potentiometer, selsyn device, or any other type of signal generator. If a selsyn type signal generator is employed, for example, the A. C. output may be rectified to thereby produce a D. C. control signal.

For a more specific illustration of a magnetometer of the character above referred to, attention is directed to U. S. Patent No. 2,406,870, issued in the name of Victor V. Vacquier, and particular attention is directed to Fig. 9 of this patent and the description thereof appearing in the specification. Additional attention is invited to U. S. Patent No. 2,373,096, issued in the name of R. K. Bonell which illustrates the association of a magnetometer or flux valve with a pivotally supported bar magnet or compass needle. The bar magnet serves to provide a much stronger unidirectional field than the earth's field but one which is aligned with the earth's field. Hence, a stronger signal may be obtained from the magnetometer through interaction with the field of the bar magnet than could be obtained through interaction with the relatively weak earth's field.

The D. C. control signal produced by magnetometer 15 appears on leads 23 and is amplified in an electronic preamplifier 20. Since the output of the signal generator is of a relatively small magnitude, that is, is measured in millivolts, it may be desirable or necessary to use several stages of preamplification to thereby produce a signal of sufficient magnitude to operate the magnetic amplifiers to be hereinafter described. The preamplifier 20 is shown as consisting of a pair of twin triodes 21 and 22 whose control grids are simultaneously energized by the control signal on leads 23. The output of the preamplifier 20 appears in two channels 24 and 25. Channel 24 contains a reversible voltage proportional to the magnitude and direction of the control signal. This signal voltage is separately applied to each field winding of the motor in such a way as to produce a rotation thereof in one direction or another depending upon which field winding is energized as hereinafter more fully described. The second output channel 25 of preamplifier 20 contains a non-reversing or unidirectional voltage proportional, therefore, to the magnitude only of the control signal. This is accomplished in the embodiment shown by a full-wave rectifier 28 placed across the output of the preamplifier triode 22. This unidirectional signal voltage is applied to the armature winding of the motor in a lagging time relation to its field energization to thereby produce a greatly increased mechanical torque output, also to be hereinafter more fully described.

Interposed between the outputs of the preamplifier 20 and the motor field and armature windings there is provided further amplifying means 26, 27, and 29 in the form of self-excited saturable reactors, sometimes called magnetic amplifiers. In the embodiment of the invention illustrated, each field winding of the motor is energized by the output of a separate field amplifier 26 and 27 and the armature winding is energized by the output of an armature amplifier 29. These amplifiers are identical in construction and operation but because the armature carries relatively high currents, its amplifier 29 is somewhat larger in size than the two field amplifiers 26 and 27.

Since the magnetic amplifiers 26 and 27 are identical in construction and in operation, as above stated, only one of them will be described in detail. The magnetic amplifier 26 consists of two separate iron cores 30 and 31 which are made up of L-shaped laminations of high silicon transformer steel. The reactance windings or self-excitation and load windings 32, 33 are wound around the outer legs of cores 30, 31 respectively while a D. C. saturation control winding 35 and bias winding 36 are wound about the two inner legs. A sizeable air gap is maintained between the two cores to prevent flux linkage or flux interaction between them. Regular E. I. transformer laminations could be used in the present application, although the double core construction is more efficient and more sensitive because all of the flux is surrounded by the control and bias windings while in the E. I. type of core some of the flux bypasses the middle leg of the unit. The reactance windings are supplied through half-wave rectifiers 37, 38 from a suitable source of alternating current 39 so that the current in each winding 32, 33 of the amplifier will be half-wave rectified A. C. and will be half the current in the load. This current provides the self-excitation of the amplifier but being D. C. it will keep the saturation of the cores at much too high a level for proper operation of the device. However, the inner core is surrounded by bias winding 36 so that the flux density in the core can be set at any desired level and will provide maximum swing of the amplifier from zero signal to maximum signal. In other words, the bias winding 36 enables the amplifier to be operated from approximately the center of the saturation curve. Of course, the saturation control winding 35 must be designed for proper matching with the signal output appearing in channel 24 of the preamplifier 20 and for as low a time constant as possible because the overall time constant of the amplifier 26 is very largely governed by the time constant of the control winding 35. The magnetic amplifier 26 is provided with negative feedback windings 40, 41 wound about the outer legs of the core 30 and connected series-opposing to the load windings 33 and 32 respectively to provide more stable and linear response of the amplifier to the control signal. Although the negative feedback windings cause a slight loss in the gain of the amplifier and are not imperative to the operation of the amplifier, their stabilizing properties are so greatly desired that the slight loss in gain is relatively unimportant. For example, if negative feedback windings 40, 41 were not employed and if the load is inductive and of low resistance, the output of the amplifier will increase extremely rapidly or will "jump" when a certain level of control current has been reached. During this sudden increase in output, the amplifier is out of control. That is to say, the output cannot be held to any intermediate point between the low level and the high level. This is, in effect, a trigger action which might well be useful in certain applications but is definitely undesirable when smooth servo control is desired.

Field amplifier 27, as stated above, is identical with field amplifier 26. It is provided with reactance windings 32', 33' supplied from source of A. C. 39' through half-wave rectifiers 37', 38'. A bias winding 36' is also provided to control the swing level of the amplifier. As in amplifier 26, a D. C. saturation control winding 35' is provided about the center cores of the amplifier 27, and is matched, like saturation control winding 35, to the output appearing in channel 24 of the preamplifier 20. Negative feedback windings 40', 41' are wound, as in the case of amplifier 26, in series opposing relation to self-excitation and load windings 33 and 32, respectively.

The armature amplifier 29 employs the same core and winding arrangement as both field amplifiers 26 and 27 but is slightly larger in size in order to accommodate the higher currents flowing therein. Reactance windings 32", 33" are supplied from A. C. source 39" through half-wave rectifiers 37", 38" which converts the current in the reactance windings to a D. C. current. In order that the reactance windings do not saturate or nearly saturate the cores of the amplifier a bias winding 36" is provided to keep the saturation at some intermediate value. The current in bias winding 36" is considerably higher than that in either bias windings 36 and 36' of field amplifiers 26 and 27 for reasons to be hereinafter more fully explained. A saturation control winding 35" is provided for controlling the amplifier and is matched to the output of the channel 25 of preamplifier 20. Negative feedback windings 40", 41" are provided in the field amplifiers to prevent "jumping" of the output signal and afford substantially linear control of the amplifier.

The operation of a magnetic amplifier such as has been above described is as follows: the reactance windings wound about outer legs of the separated core members induce therein a flux density proportional to the D. C. current in the windings as shown by the arrows in the drawings. In order to provide control of the amplifier from the knee of the saturation curve a D. C. bias winding is provided to limit the flux induced by the reactance winding to a point on the knee of the saturation curve. Therefore, any D. C. control current in the control winding will cause the flux density in the core to increase or decrease in an amount proportional to control current and thereby increase or decrease the current in the reactance windings in the same proportion.

The output current of amplifier 26 appears on leads 42, 43 which are connected to one field winding 44 of the servomotor 45. By tracing the current flow through the various elements of the magnetic amplifier 26 it will be seen that the current in field winding 44 will always flow in the same direction. The output leads 46, 46' of amplifier 27 which are connected across the other field winding 47 will also always carry current in the same direction but this direction will be opposite to that of field winding 44. Armature amplifier 29 has its output leads 48, 49 connected to the armature winding 50 of motor 45 and here again, the windings of the amplifier are so arranged as to provide a unidirectional current in the armature winding. The output of the servomotor 45 serves to control the movement of the craft control surface shown here as a rudder 51. Suitable reduction gearing 52 and a cable drive 53 are provided for transforming the relatively high speed of driving motor 45 to a useable relatively small displacement of rudder 51.

To insure a smooth and accurate control of the servomotor both displacement feedback and speed feedback are provided. The latter consists of a small speed generator 55 directly connected to the drive shaft 56 of the motor 45. Rotation of the shaft 56 by motor 45 causes a rotation of generator 55 to thereby produce in leads 57 a D. C. signal proportional to the speed of rotation of the motor 45. This speed signal is fed directly to the control grids of the twin triodes 21 and 22 but in opposite polarity to the control signal to thereby produce a speed feedback signal which provides damping of servomotor 45 to prevent it from hunting. A displacement repeat-back or wipe-out signal is also provided in the system by potentiometer 58 controlled according to actual rudder displacement so that the rudder drives over until the algebraic sum of, or the difference between the displacement repeat-back signal and the control signal is zero.

The operation of the servomotor control system of the present invention will now be described. Assuming the craft upon which the same is mounted to be on a prescribed course as set by compass card 12 and lubber 13, zero error signal will appear on leads 23. However, a small standby current will flow in the output windings of field amplifiers 26 and 27 and equal and opposite currents will flow in the two field windings 44 and 47 of servomotor 45 so that the resulting field flux will be zero and the motor will remain at rest. Likewise, at zero signal a standby current will flow through armature winding 50 which standby current may be adjusted by increasing or decreasing the bias potential in the bias winding 36" of the armature amplifier 29. This standby current should be high enough to insure immediate response in the motor for the smallest unbalance in the fields 44, 47 of the motor 45 but low enough to prevent overheating of the motor at standby.

Figure 2:
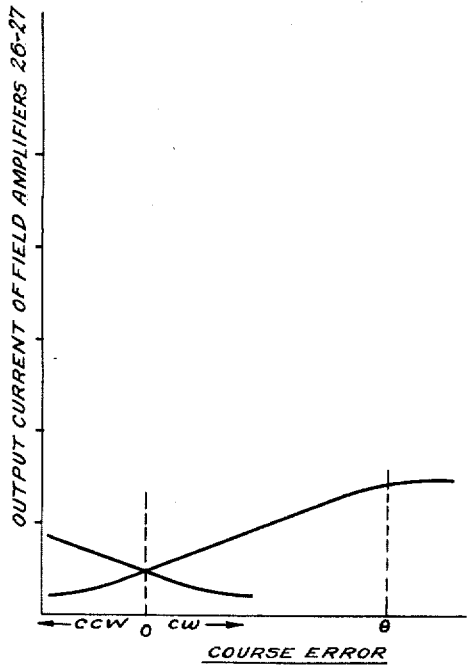
Figs. 2, 3 and 4 show characteristic curves which indicate its mode of operation.
Figure 3:
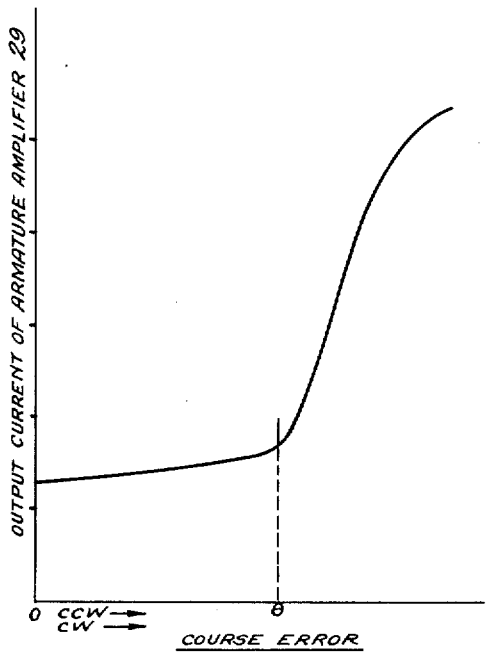

Let us assume now that it is desired to change the course of the craft. The operator turns control knob 17 which positions index 13' to the desired new course and thereby causes a displacement of the magnetometer case with respect to the compass needle. By this movement a D. C. signal will appear on leads 23 which is proportional to the magnitude and direction of the displacement. This signal is applied to the electronic preamplifiers 20 where it is amplified and emerges in the two separate channels 24 and 25. Channels 24 will produce an increase or decrease of current in the control windings 35, 35' of the field amplifiers 26 and 27. A corresponding signal proportional to the magnitude only of the control signal appearing on lead 23 will appear in the second channel 25 and a corresponding increase in the control winding 35" of the armature amplifier 29. The following sequence of events will take place in the field amplifiers 26 and 27 and the armature amplifier 29:

Suppose that the field amplifiers are carrying a certain bits current, say 35 milliamperes, in bias windings 36 and 36' and that the armature amplifier is carrying a bias current of a considerably higher value, say 100 milliamperes. This difference in bias currents between the field and armature amplifiers is very important in the successful and novel operation of the servomotor control system of the present invention. Since the field amplifiers have only a relatively small bias current, a small control signal will be sufficient to cause one or the other amplifier to become nearly saturated. This in turn will cause a corresponding increase in the current of the related field winding of the motor. (It is to be understood of course, that the control signal appearing in channel 24 is reversible and that it will cause an increase in the saturation of one or the other of the field amplifiers and therefore an increase or decrease in the corresponding field windings of the motor depending on the sense or direction of the control signals appearing on leads 23.) The armature amplifier, however, will not saturate at the same signal level as the field amplifier because of its larger bias current, but will only begin to saturate at, or just before the signal level at which the field amplifier saturates completely, thereby providing the desired time lag between the full output of the field and armature amplifiers. (It should be understood, however, that even at no signal the armature amplifier output current never drops to zero, since the motor would then be incapable of starting.) Referring particularly to Fig. 2 of the drawings, a better understanding of the relationship between the excitation of the field amplifiers may be obtained. Here it may be seen that as the course error and thereby the control signal increases in either direction from zero in each of the field amplifiers, one field amplifier will increase to saturation while at the same time the other decreases to a minimum saturation. Since the output current of the armature amplifier 29 will be constant or only slightly higher than at standby condition due to the high bias therein as shown in Fig. 3 and since one of the field amplifiers is near full output and the current in the other one of the field windings has dropped to minimum output, the principle of operation of the servomotor 45 up to this point is that of a constant armature current motor, field controlled.

Figure 4:
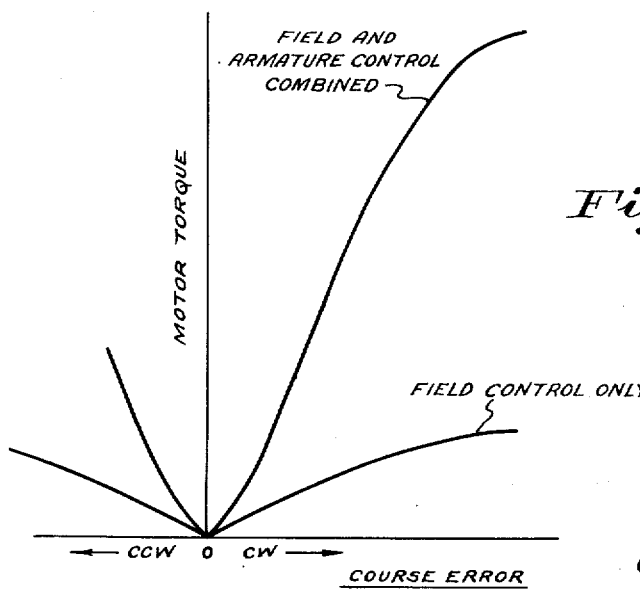

If the control signal keeps increasing until it goes beyond a value determined by the course error signal $\theta$, one of the field amplifiers will saturate and the armature amplifier will begin to build up to its own maximum saturation after the control signal has increased enough and overcome the high bias current therein. This will be apparent when considered in respect to Figs. 2 and 3 of the drawings. Therefore, there is now provided not a field controlled motor but an armature controlled motor with the field being substantially constant. From the above, it will be noted, that the armature 50 of the servomotor 45 is energized in a lagging time relation to the energization of the field winding 44 or 47 due to the difference in bias currents in the field and armature amplifiers. In other words, the current in one of the field windings, say winding 44, for a given direction of the error signal voltage, will increase substantially linearly with an increase of the error or control signal voltage up to some predetermined value thereof, at which time the field amplifier 16 which controls the current in the field winding 44 will become substantially saturated. Thereafter, for further increases in the signal voltage above said predetermined value, the current in the field winding 44 will remain substantially constant. However, the current in the armature winding 29 for the same initial increase in the signal voltage will remain substantially constant until the said predetermined value of signal voltage is reached. At this time, the bias in the armature amplifier 29 will be overcome and the current in the armature winding will increase with an increase in the error signal voltage substantially at and in excess of said predetermined value of signal voltage. There is perhaps a slight overlap between the two types of control but this is not sufficient to produce any square law effect and the control is substantially linear throughout almost the entire range of operation as illustrated in Fig. 4. The armature amplifier 29 might also be called a booster amplifier since it serves the purpose of boosting the torque output of the motor for peak loads. The effect of the combined armature and field control on the torque output of the motor 45 may be seen more clearly with respect to Fig. 4.

While I have described my invention in its preferred embodiment, it is to be understood that the words which I have used are words of description rather than of limitation and that changes within the purview of the appended claims may be made without departing from the true scope and spirit of my invention in its broader aspects.

What is claimed is:

1. A motor control system comprising, a motor having a pair of field windings and an armature winding, magnetic amplifier means coupled with said field windings and said armature winding for supplying current to said windings, a source of control signal voltage, means for controlling the magnitude and direction of the output current of said field amplifier means substantially linearly in accordance with the magnitude and direction of said signal voltage up to a predetermined value thereof, means for controlling the magnitude of the output current of said armature amplifier in accordance with the magnitude of said signal voltage, means for rendering said last mentioned control means effective to increase the current in said armature amplifier when and after said signal voltage has attained said predetermined value, and means for connecting said outputs to said field windings and said armature winding.

2. A motor control system comprising, a motor having a pair of field windings and an armature winding, a source of alternating voltage, a pair of saturable core reactors connected in circuit with said pair of field windings and a saturable core reactor connected in circuit with said armature winding, each of said saturable core reactors having reactance windings supplied from said source and a saturation control winding, means connected in circuit with said reactance windings for rectifying the current therein, thereby to provide an initial fixed polarity and degree of saturation of said reactors, means for providing a control signal voltage, means for supplying said control signal voltage to said field reactor control windings for selectively increasing the degree of saturation of one of said field reactors substantially linearly in accordance with the direction and magnitude of said control signal voltage up to a predetermined value thereof and correspondingly decreasing the degree of saturation of the other of said field reactors, means for supplying said control signal voltage to said armature reactor control winding for increasing the degree of saturation of said armature reactor in accordance with the magnitude of said control signal voltage, means for rendering said last mentioned control means effective to increase the current in said armature amplifier when and after said signal voltage has attained said predetermined value, and means for connecting said reactance windings to said field windings and said armature winding.

3. A motor control system comprising a motor having a pair of field windings and an armature winding, a source of alternating voltage, a pair of saturable core reactors connected in circuit with each of said field windings, each having a reactance winding supplied from said source and a saturation control winding, means connected in circuit with said reactance windings for rectifying the current therein, thereby to provide an initial fixed polarity and degree of saturation of said pair of reactors, a source of control signal voltage, means for supplying said control signal voltage to said saturation control windings for selectively increasing the degree of saturation of one of said reactors substantially linearly in accordance with the magnitude and direction of said control signal voltage up to a predetermined value thereof and correspondingly decreasing the degree of saturation of the other of said reactors, a feedback winding on each of said field reactors for increasing the difference in saturation produced by said control windings, and means for connecting the reactance windings of said field reactors to said motor field windings, a third saturable core reactor connected with said armature winding having a reactance winding supplied from said source and a saturation control winding, means connected in circuit with the reactance windings of said third reactor for rectifying the current therein, thereby to provide an initial fixed polarity and degree of saturation of said third reactor, means connected in circuit with the control winding of said third reactor for supplying said control signal always in the same polarity sense thereto whereby to increase the degree of saturation of said third reactor in accordance with the magnitude of said control signal voltage, means for rendering said last mentioned control means effective to increase the current in said armature amplifier when and after said signal voltage has attained said predetermined value, a feedback winding on said third reactor for increasing the degree of saturation produced by said control winding, and means for connecting the reactance windings of said third reactor to the armature winding of said motor.

4. A servo system comprising a reference member and a controlled member, means coupled with said reference member for producing an error signal, a motor for driving said controlled member having a pair of field windings and an armature winding, means for supplying current to said windings, means for controlling the magnitude and direction of the current in said field windings in accordance with the magnitude and direction of said error signal up to a predetermined value thereof, means for controlling the magnitude of the current in said armature winding in accordance with the magnitude of said error signal, means for rendering said last mentioned control means effective to increase the current in said armature winding when and after said signal has attained said predetermined value, means coupled with said controlled member for providing signals proportional to the speed and displacement of said controlled member, and means for controlling said motor in accordance with said error signal and said speed and displacement signals.

5. A motor control system comprising, a motor having a field winding and an armature winding, means for supplying current to said windings, a source of control signal voltage, first amplifier means coupled with said field winding and said control signal source for controlling the magnitude and direction of the current supplied to said field winding substantially linearly with the magnitude and direction of said control signal voltage up to a predetermined value thereof, second amplifier means coupled with said armature winding and said control signal source for controlling the magnitude of the current supplied to said armature winding in accordance with the magnitude of said control signal voltage, and biasing means coupled with said second amplifier means for effecting control of said armature winding to maintain the current therein substantially constant until said signal voltage has attained said predetermined value.

6. A motor control system comprising, a motor having a field winding and an armature winding, means for supplying current to said windings, a source of control signal voltage, first amplifier means coupled with said field winding and said control signal source for controlling the magnitude and direction of the current supplied to said field winding substantially linearly with the magnitude and direction of said control signal voltage up to a predetermined value thereof, second amplifier means coupled with said armature winding and said control signal source for controlling the magnitude of the current supplied to said armature winding in accordance with the magnitude of said control signal voltage, biasing means coupled with said second amplifier means for effecting control of said armature winding to maintain the current therein substantially constant until said signal voltage has attained said predetermined value, means coupled with said motor for providing a signal proportional to the speed thereof, means for combining said speed signal with said control signal, and means for supplying the resultant signal to both of said amplifier means.

7. A motor control system comprising, a pair of field windings and an armature winding, a source of alternating voltage, a pair of saturable core reactors connected in cricuit with said pair of field windings and a saturable core reactor connected in circuit with said armature winding, each of said saturable core reactors having reactance windings supplied from said source and a saturation control winding, means connected in circuit with said reactance windings for rectifying the current therein, thereby to provide an initial fixed polarity and degree of saturation of said reactors, a source of control signal voltage, means for supplying said control signal voltage to said field reactor control windings for selectively increasing the degree of saturation of one of said field reactors depending upon the direction and magnitude of said control signal voltage and correspondingly decreasing the degree of saturation of the other of said field reactors, a bias winding on each of said field reactors for providing a substantially proportional increase of saturation of said one field reactor by said control signal voltage up to a predetermined value thereof, means for supplying said control signal voltage to said armature reactor control winding for increasing the degree of saturation of said armature reactor dependent upon the magnitude only of said control signal voltage, a bias winding on said armature reactor for preventing any substantial increase in saturation of said armature reactor for values of said control signal voltage below said predetermined value, and means for connecting said field reactance windings to said field windings and said armature reactance winding to said armature winding, whereby said one field reactor will become substantially saturated for a predetermined value of said control signal voltage while saturation of said armature reactor will be postponed until said control signal voltage exceeds said predetermined value.

8. A motor control system comprising a motor having a field winding and an armature winding, means for producing a reversible polarity control signal voltage having a magnitude dependent upon the magnitude of a control value and having a polarity sense dependent upon the sign of said control value, means for supplying current to a first of said windings so as to produce an electromagnetic field having a direction and magnitude dependent upon the amplitude and polarity sense of said signal voltage, means for supplying an irreversible current of relatively small constant magnitude to the second of said motor windings during zero signal conditions of the system, and means for varying the current in said second winding above said small value of current and in accordance with the magnitude of said signal voltage for values of signal voltage above a predetermined value, said predetermined value of signal voltage being of a size order providing substantially maximum current flow in said first motor winding.

9. A steering system for ships and the like comprising a magnetic compass including a magnetized needle, a magnetometer associated with said compass for supplying a signal voltage depending upon departures in heading of the craft relative to a selected heading, a source of pulsating current for said magnetometer, manual means for adjusting the magnetometer relative to the compass whereby a desired heading may be selected, amplifier means including a demodulator connected to receive the signal output of said magnetometer and an amplifier stage controlled by and connected to receive the output of said demodulator, a servomotor controlled by the output of said amplifier means, said servomotor being connected to drive the rudder of said craft, a potentiometer connected to be driven in accordance with movements of the craft's rudder, a current source connected to said potentiometer, and circuit means connecting the output of said potentiometer in degenerative fashion to said amplifier means whereby a signal voltage proportional to angular movements of the craft's rudder is employed to oppose the deviation signal derived from said magnetometer.

10. A steering system for ships and the like of the character recited in claim 8, additionally comprising a speed voltage generator connected to be driven by said servomotor and having its output connected in degenerative fashion to said amplifier means.

11. A steering system for ships and the like of the character recited in claim 9 in which the source of pulsating current for the magnetometer comprises a battery and vibrator.

12. A steering system for ships and the like of the character recited in claim 9 in which the amplifier stage comprises a magnetic amplifier.

13. A control system for a direct current motor having a rotary armature and two field windings, simultaneous energization of said armature and one of said field windings causing rotation of said armature in one direction and simultaneous energization of said armature and the other of said field windings causing rotation of said armature in the opposite direction, said control system comprising: means for energizing said armature; means defining an input circuit for the control of said motor and adapted to have a unidirectional control potential applied thereto for determining the speed and direction of rotation of said armature in accordance with the magnitude and direction of said control potential; symmetrical two-channel amplifying means connected to said input circuit for response to said control potential, each of said two channels being selectively responsive to a different polarity of said control potential and each delivering a unidirectional current output in accordance with the magnitude of said control potential when said control potential is of the polarity to which the particular channel is responsive; circuit means connecting said two channels symmetrically to said two field windings for controlled selective individual energization of said field windings by said output currents, whereby the speed and direction of rotation of said armature is determined by the magnitude and direction of said control potential with a predetermined energization of said armature.

14. A control system according to claim 13 further comprising; means driven by said armature for generating a unidirectional speed potential of which the magnitude and direction are determined by the speed and direction of rotation, respectively, of said armature; and circuit means applying said speed potential to said input circuit differentially with respect to said control potential to derive an error signal, said amplifying means being responsive to said error signal, whereby the speed of said armature will remain substantially constant at a value determined by said control potential notwithstanding variations in the torque delivered by said armature.

References Cited in the file of this patent
UNITED STATES PATENTS

| | | |
|---|---|---|
| 1,847,934 | Elder et al. | Mar. 1, 1932 |
| 2,081,780 | Troger | May 25, 1937 |
| 2,115,086 | Riggs | Apr. 26, 1938 |
| 2,256,875 | Wade | Sept. 23, 1941 |
| 2,443,639 | Potter | June 22, 1948 |
| 2,504,155 | Roman | Apr. 18, 1950 |
| 2,519,118 | Curtis et al. | Aug. 15, 1950 |

U. S. DEPARTMENT OF COMMERCE
PATENT OFFICE

CERTIFICATE OF CORRECTION

Patent No. 2,813,236     Gerard P. de Westfelt         November 12, 1957

It is hereby certified that error appears in the printed specification of the above numbered patent requiring correction and that the said Letters Patent should read as corrected below.

Column 1, line 66, for "conrtol" read -- control --; column 6, line 58, for "bits" read -- bias --; column 9, line 68, for "cricuit" read -- circuit --; column 10, line 66, for the claim reference numeral "8" read -- 9 --.

Signed and sealed this 24th day of June 1958.

(SEAL)
Attest:
KARL H. AXLINE
Attesting Officer

ROBERT C. WATSON
Commissioner of Patents